United States Patent [19]
Ramirez

[11] 3,969,203
[45] July 13, 1976

[54] WASTE WATER TREATMENT
[75] Inventor: Ernest R. Ramirez, Lemont, Ill.
[73] Assignee: Swift & Company, Chicago, Ill.
[22] Filed: Feb. 19, 1974
[21] Appl. No.: 443,613

[52] U.S. Cl. .............................. 204/149; 204/152; 210/44
[51] Int. Cl.² ..................... C25F 1/00; C25B 1/04
[58] Field of Search.................. 204/149, 151, 152; 210/44

[56] References Cited
UNITED STATES PATENTS

| | | | |
|---|---|---|---|
| 1,956,411 | 4/1934 | Bonine | 204/25 |
| 3,347,786 | 10/1967 | Baer et al. | 204/149 X |
| 3,366,559 | 2/1968 | Hughes et al. | 204/149 |
| 3,479,281 | 11/1969 | Kikindai et al. | 210/44 |
| 3,505,188 | 4/1970 | Pan | 204/149 |

Primary Examiner—John H. Mack
Assistant Examiner—A. C. Prescott
Attorney, Agent, or Firm—Edward T. McCabe; Charles E. Bouton; Jay C. Langston, Jr.

[57] ABSTRACT

A method of treating industrial waste water containing suspended particles such as mineral oil, fats, proteins, glycerides, fibers, and biodegradable materials, by exposing said water to a plurality of positive and negative electrodes whereby high current densities are used to create large volumes of microbubbles which float the particles to the surface and periodically reversing the current so as to keep the cathodes clean is disclosed.

11 Claims, No Drawings

WASTE WATER TREATMENT

This invention is concerned with a method for treatment of industrial waste waters and other effluents containing emulsified amounts of oils, fats, greases and other oily materials which may or may not contain proteins, biodegradable materials and other polar substances. The process is especially useful in connection with edible oil operations or with packinghouse operations, but can also be used to advantage in the treatment of effluents containing mineral oils from industrial plants.

There are, in various fields of industry, effluents from the operating processes, usually aqueous which contain a separable phase. In the paper industry, for example, the effluent from the manufacturing process contains cellulose, fibers and sometimes mineral fillers such as kaolin. In the meat industry, the waste from the abattoirs contain animal fats, proteins and other organic materials. In the manufacture of iron products such as in rolling mills, effluent waters contain oil and particles of iron. In the petroleum industry, numerous products having densities lower than that of water are separable only with difficulty using ordinary methods such as decantation or centrifugation. Some industrial processes contain phases which are hydrophobic such as the latex or plastics industries. Clearly, many of the rivers and streams of the world are contaminated with various kinds of insoluble and suspended organic and inorganic materials.

Generally speaking, free fat and oil, i.e., not emulsified fat and oil, present no serious problems in regard to separation from water as they generally float to the surface and can be skimmed off. Emulsified fats, on the other hand, stay in solution, causing severe pollution problems. In this connection, it has been the usual practice in the past to run the waste water from a packinghouse to a settling tank or basin having baffles wherein the water would set for an hour or so and the free fat would rise to the top and be skimmed off. The emulsified fat would of course remain in the water and would accompany it to the sewers. Various means, such as aeration and complex apparatus have been employed in attempts to deemulsify the waste waters. Usually, however, unless the emulsified oil was very valuable, no effort was made to recover it from the water that was eventually passed to the sewers and hence to the streams and rivers.

In processes where water is reused, the oil can be removed from the system by coagulation with aluminum sulfate and alkali, followed by filtration. The oil is caught in the floc and filtered out of the system. However, periodic backwashes of the filter with hot caustic soda are required. It should be noted, however, that the processes used to completely remove the oil from the water are clearly uneconomical for use in cleaning up waste water from packinghouses, petroleum industry waste and edible oil operations.

In order to resolve the problem of separating a suspended phase from the water, various industrial processes have used the technique of flotation by introducing bubbles of gas into the liquid which attach themselves to the particles of the separable phase, which may be either solid or liquid, imparting an apparent density to the particles which causes them to be lifted out of the liquid which contains them and which transports them to the surface from whence they can be removed.

In the electrochemical treatment of waste waters an electric current is passed through the waters usually after a coagulant has been added. In the usual operation of cells using iron electrodes, polarization of the electrodes occurs due to continued passage of current in the same direction and is usually accompanied by an accumulation of metal hydroxide deposits on the cathodes. Scrapers and various other means have been used to remove the deposits. Even agitation of the waste water near the cathode has been employed to retard polarization. Even when these precautions are taken, polarization and resistance of the cell due to accumulations of metal hydroxide deposits around the cathodes causes a gradual reduction in the amount of current flow. Deposition of metal hydroxides leads to high cathodic electrode resistance, a drastic reduction in current density and a reduction in the important number of microbubbles per liter along with charge neutralization. Some of this may be compensated for by increasing the voltage applied to the electrochemical cell in an effort to maintain the current flow substantially constant. The voltage required, however, eventually increases to an abnormally high value and in effect prevents the continued operation of the cell.

In flocculating industrial waste waters by electrochemical means, rather high current densities are employed on both anode and cathode surfaces. The anode surfaces are generally insoluble electrodes or "slowly soluble" electrodes while the cathodes are often made of steel or some other inexpensive metal. High current densities are needed in the process to obtain sufficient microbubble action and charge neutralization. While this is going on, methyl hydroxide (mostly calcium and iron) are being deposited on the cathode. This is especially true when iron and calcium ions are used as coagulants. This deposition is encouraged by the high pH present at the cathode during electrolysis. The useful life of the cathode under these circumstances is usually between 3 and 6 weeks. After this time, the surface resistance of the cathode becomes very large and the passage of current is drastically reduced. At this point in time, the cathodes must be removed, acid cleaned and finally replaced. The trouble, cost and time lost by cleaning cathodes makes electrolytic flocculation a troublesome process.

Accordingly, it is one object of this invention to provide a means for carrying out electrolytic reactions in industrial waste water whereby the anodes and cathodes are self-cleaning.

Other objects and advantages will become readily apparent to one skilled in the art upon reading the following description of the invention.

In general, this invention takes full advantage of partially soluble electrodes like ferrosilicon alloys when forming microbubbles during industrial waste water treatment. The method stipulates that the polarity of the electrodes be reversed periodically. Under such conditions, the anode becomes the cathode and vice versa. Metal hydroxides formed on the cathode during the first period of operation will be completely dissolved during the second period of operation when the contaminated electrode becomes anodic.

The industrial waste water usually containing about 0.1%–5% of oily material is exposed to a plurality of spaced apart metallic electrodes which are held in place by any nonconductive material inert to the solution being treated or the gases contained therein. The electrodes in a unit are usually rod shaped and spaced less than 2 inches apart, preferable less than 1 inch apart. However, the type of solution and resistance thereof are considerations in determining this spacing. Alternate spaced electrodes (anodes) are connected in parallel to one side of a D.C. supply current. The other electrodes are connected in parallel to the other side of the system. Usually a timer having a reversing switch is used to reverse the polarity of the electrodes, however, it can be done manually. Generally, the current is reversed at least once in any given 24-hour period. Further reversing of polarity is usually done in repetitive cycles.

About 5–120 ampere/sq. ft. of cathode, while impressing a constant voltage, will be utilized. Voltages will generally run between 10–20 volts (12–15 volts preferred). As will be discussed later, ferric sulfate or other coagulant is added in amounts of 10–10,000 ppm. This results in a reduction of pH of about 3–5 units. Slaked line in an amount of about one-half to one-third of the weight of the ferric sulfate is added so that the water has a pH of about 6–8.5 for microbubble formation and for the reversing of the polarity of the electrodes.

In general, the instant invention is especially applicable to those processes wherein the formation of microbubbles in waste water interact with suspended material to form an "embryo floc." An "embryo floc" is that floc formed by the interaction among coagulant (if used), solid and liquid colloidal particles and the microbubbles. An "embryo floc" while usually comprising a coagulant need not of necessity possess a coagulant. The time interval needed to form "embryo floc" can vary from about 10 sec. to several minutes. Under certain circumstances, an embryo forming time can be as long as 30 minutes or longer. In essence, microbubbles of either hydrogen, oxygen or air are formed in the waste water to which multivalent metal ion coagulants have often been added. The microbubbles are formed in such a number that the number of microbubbles per liter of waste water generally exceed about $10^4$.

Generally speaking, most suspended liquids or solids (often colloidal emulsions) in waste water are negative in charge and multivalent metal ions are often added to react with the negative particles, and by coagulation, to break the emulsion. These coagulants, such as aluminum sulfate, alum, ferric sulfate, ferric chloride, etc., break down emulsions and ionize to their hydroxide structure and form part of an "embryo floc." By so doing the pH of the waste water is often lowered to about 5.7 and lime is added to bring the pH back to about 6.5–8.0. In the present invention there is a close and beneficial interaction between the fine microbubbles and the water impurities which become attached thereto. This is why it is so important to have clean electrodes so that the number of microbubbles will not decrease. This condition allows the microbubbles to efficiently attach themselves to the many colloidal particles with or without the use of flocculants and thereby from an "embryo floc."

Usually, a polyelectrolyte is added to the "embryo floc" after microbubble formation whereby a complete floc is formed encompassing the metal hydroxide, foreign water impurities, the polyelectrolyte and sizable volume of microbubbles. This final floc is a compact structure with a low apparent density (usually about 0.7–0.9) which is less than the water itself. As a result, the formed floc rises rapidly to the surface leaving behind clarified water.

When electrolysis takes place the microbubbles usually consist of hydrogen and oxygen. The formation of the microbubbles is especially beneficial since there is a very large interfacial surface for interaction between the charged microbubbles and the charged colloidal material in the waste water.

A preferred feature is that the flocculants (polyelectrolytes) are added only after (which may be substantially instantaneously after) the microbubbles have been formed and this condition leads to the formation of a final floc consisting of at least three phases; namely, a water phase, a gas phase (microbubbles) and, finally, a solid phase consisting of metal hydroxides and foreign water impurities.

In the present invention it has found that the gas bubbles for flotation of foreign impurities in water are most effective between the sizes of about 10 and 500 microns preferable between about 20 and 300 microns. The particular invention prefers air bubble size in the 20 to 200 micron size (diameter); however, it has been found that the process will function properly even when the bubbles are as small as 10 microns or as large as 500.

It is important, however, that the bubbles be generated in sufficient quantity to exceed about $10^4$ bubbles per liter of water treated. Generally, the number of bubbles per liter will exceed $10^5$, preferably $10^6-10^9$, as it has been found that the greater the number of bubbles the greater the effect. The upper limit is dictated by economics. The microbubbles rise in the water at a rate which is a function of their diameter, namely, smaller microbubbles rise more slowly. This is especially important because the rate of rise of the gas microbubble determines the time which the bubble resides in the water phase. Larger residence time provides greater probability for contact and subsequent union with the pollutant particle.

The instant invention is a waste water treatment process which may be used in reducing the total suspended solids of municipal and industrial waste streams. In a particular embodiment the waste stream passes through an electrocoagulation zone, and a flocculation zone. A point can be selected in the waste stream at about a few seconds to several minutes flow time removed from the electrocoagulation zone for the introduction of the polyvalent metal ions. A sufficient amount of multivalent metal ions (10 to several thousand ppm) is introduced in the waste water usually prior to contact with the microbubbles formed in the electrocoagulation cell. In some systems metal compounds are used to provide about 10 to about 10,000 (preferable 10–1,000 ppm) parts per million by weight of aluminum, calcium or iron ions. After allowing the metal ions to disperse and interact with the microbubbles and pollutants in the aqueous waste stream for a period of time, usually a fraction of a minute to several minutes, a small amount in the order of from about 0.1 to about 100 ppm (usually 1–10 ppm) of a polyelectrolyte is introduced into the stream while the waste water is conveyed to a settling treatment basin where the floc particles are removed from the surface of the waste water.

While the invention is not restricted to a particular polyelectrolyte, it has been found that high molecular weight anionic polymers such as copolymers of from 90 to 50 weight per cent acrylamide or methacrylamide and from 10 to 50 weight percent acrylic or methacrylic acid or water soluble salts thereof produce outstanding results. These copolymers are characterized by a weight average molecular weight of at least from about 2 million and usually up in the range of about 7 to 12 million as measured by the light scattering technique. Such polymers are known in the art and are available from several commercial sources.

It has been found that for effective flotation of waste water floc, the electrolytic energy needed to form the "embryo floc" lies between about 1 ampere-minute per gallon and about 8 ampere-minutes per gallon. While the energy input may vary between 0.5 ampere-minutes/gallon (for very lightly contaminated waters) to up to 50 ampere-minutes per gallon, usually about 20 ampere-minutes is the upper limit due to economics. A good operating range is about 0.5–8 ampere-minutes per gallon, usually 0.5–5 ampere-minutes per gallon of waste water treated. Under these conditions the floc formed after the addition of the polyelectrolyte will surface rapidly and completely.

It has also been found that the volume of the microbubbles needed to carry out efficient and rapid flotation of the formed floc lies between about 0.1 volume percent and 20 volume percent, usually 0.3 volume percent to 10 volume percent (standard temperature and pressure) of water volume. Excellent results have been found when the volume percent of gases in the water was in excess of 0.3 volume percent, and using 1.5–50 ampere-minutes per gallon of water treated with $10^5 - 10^9$ microbubbles per liter and a micron bubble diameter of about 30–200 microns.

While the design of an electrolytic cell can vary widely it has been found advantageous to keep it as small and compact as possible. In order to keep power cost down, electrode spacing (surface to surface) in the electrolytic cells should be kept less than 2 inches apart. Usually, anodes and cathodes are alternately spaced. Circular anodes and cathodes are very effective and the invention is not restricted to the physical configuration of the electrodes. Accordingly, squares, rectangular sheets and other types of anodes and cathodes can be used satisfactorily. It has been found, however, that duriron anodes produce very good results. Electrode current densities should be as high as practical, between about 5 and 200 amperes per square foot, usually about 10–100 amperes per square foot of electrode.

The concept of periodic reversal of electrodes is especially useful in the treatment of water systems containing suspended or dissolved particles subjected to a plurality of gradient current density zones. In such a system, each current zone contains an electrode bank comprising a grid or electrode pairs having an important relationship to the amount of impurities in the water. Ideally, the average current density using the tank bottom as a unit of area is diminished as the water passes through a treating tank. This is usually accomplished by varying the distance between electrodes or the arrangement of the electrodes as will be brought out more in detail as the specification proceeds.

It should be mentioned at this time that two types of current densities are discussed in this specification. There is a current density produced at the electrodes which is real and there is one found at the tank bottom which is imaginary but calculatable. There is an unlimited number of ways to produce a gradient of current densities at the tank bottom. For example, if the amperage at the electrode remains constant, the average current density per square foot of tank bottom will diminish if each electrode pair is placed farther apart of the distance between anode and cathode is increased.

In treating waste water from a plant, about 10–4000 ppm, usually about 300–400 ppm of alum or other multivalent metal salt will be placed in the influent pipe usually about 20 feet ahead of the flotation tank. Very gentle mixing is desired and extreme agitation is avoided. After a few minutes of mixing a small amount, about 0.1 to about 5 ppm of a polyelectrolyte is added to the system. The waste water is allowed to flow over a plurality of electrodes creating a current density gradient at the tank bottom. The current density zones are created by the use of a plurality of electrode banks lying near the bottom of the tank floor. The current densities used at the tank bottom are related to the amount of solid, foreign material in the waters above the grid. The higher the concentration of foreign materials present the higher must be the effective current density employed. Further, average current densities per unit of tank bottom at the influent end is substantially greater (about 2–100 times, preferable more than 10 times greater) than that at the effluent end. The gradient from one end of the tank to the other may be step-wise or gradual.

In one embodiment of this invention, it is preferred to have the electrode banks extend over substantially the entire surface of a treating tank at or near the bottom of the tank. The current density that is referred to in this invention is meant to be amps per square feet or tank bottom covered by the electrode bank, even though the anode and cathode structures be made of mesh wire, open grid (70% open area) or spaced wire or electrode pairs. Good results have been obtained in using sheets of hexagonal patterned stretch metal for cathodes with rod-shaped anodes sandwiched in between. However, one may use any sort of open area design.

In most systems optimum results are obtained if two or more ranges of current density values are used in a single waste treating tank. The invention also encompasses the use of a gradient of energy input from one end of the tank to the other. Energy input is the product of current times voltage, i.e., watts, and like current density, the average energy input per unit area of tank bottom at the influent end should be substantially greater than that at the effluent end. When the voltage is constant, wattage is directly proportional to the amperage.

Generally, a waste water treating tank will vary in size depending upon the amount of water being treated. In order to treat 600 gallons per minute of industrial waste water, for example, the following dimensions would be considered realistic: length 40 feet; width 15 feet; and depth 4½ feet.

Since there is a critical relationship between optimum current density of the anode-cathode grid or electrode pairs and the amount of impurities in the water, it follows that ideally the current density in the electrode banks should be diminished as the water passes through the treating tank. Ideally, one facet of the invention can best be applied by dividing a treating tank into four electrode bank sections. However, it is specifically pointed out that three sections, five sections, or additional sections may be employed. In a four zone clarification tank the current density in the second section is a fraction of that in the first section and is approximately half that in the first section.

In a typical tank, a tank 20 feet long and 8 feet wide a series of electrode pairs 1 inch apart between anode and cathode can be used. Distance between the first electrode pair and the second electrode pair is 4 inches, that between the second electrode pair and the third electrode pair is 8 inches, between the third electrode pair and the fourth electrode pair is 12 inches, and so on with distances between consecutive electrode pairs always increasing about 4 inches. This kind of energy distribution is gradual rather than stepdown. Thus energy input in the treatment tank is made up of small packages (electrode pairs) and the density of these pairs are varied to provide the desired energy gradient. Usually, the energy input at the influent section of the tank, based on area of tank bottom should lie between about 40 and 120 watts (preferable 50–100 watts) while at the effluent portion of the tank energy input will range from about 4 to 12 watts (preferable 5–10 watts) per square foot when 10 volts is used.

In a specific example, a tank 25 feet long, 6 feet deep and 8 feet wide was divided into 4 sections. Each section was 8 feet by 4 feet leaving 9 feet at the influent end to be used as the floc chamber and for baffles. The first section (nearest the influent end) had nine rod-shaped Duriron electrodes 2 ⅜ inches in diameter and 7 feet long spaced equally over 4 feet and transverse the flow of water. The second section employed seven electrodes, section 3 had five electrodes while section 4 used four electrodes. The electrodes in each of these sections were equally spaced apart and were alternately anodes and cathodes connected in parallel. Current drawn in each of the four sections was approximately 150 amperes, 75 amperes, 40 amperes and 20 amperes. Ten volts was employed and common to all four sections. Waste water, high in protein and fats from a meat packing plant was treated. The polarity of the anodes and cathodes was reversed every 24 hours. Properties of entering and leaving water from the tank was as follows:

| | Influent Waste Water | Effluent Water |
|---|---|---|
| 1. Hexane extractables | 5,230 ppm | 30 ppm |
| 2. Suspended solids | 4,300 ppm | 100 ppm |
| 3. pH | 7 – 12 | 6.5 – 7.5 |

Subsequent current density zones are diminished usually by a factor of about one-half. For example, if the current density in the first section (closest to the influent end) lies between about 3 to 20 amps per square foot of tank bottom over that section; the second section would have a current density of about 2.5 to 10 amps per square foot. The third section will have about 1.25 to 5 amps per square foot; while the last section will have about 0 to 2 ½ amps per square foot.

When using anode-cathode grids, the present invention defines the optimum space in between the anode and cathode to be somewhere between 0.25 inches and 2 inches. It is possible to operate an anode-cathode grid beyond the 2 inch spacing but the power consumed becomes even larger with larger distances. It is pointed out that it is very important that the anode-cathode grid be as far away from the skimming surface as possible. If the spacing is much greater than 8 inches from the bottom of the tank, some of the desired neutralization and coagulation is irretrievably lost.

Obviously, many modifications and variations of the invention as hereinbefore set forth may be made without departing from the spirit and scope thereof, and, therefore, only such limitations should be imposed as are indicated in the appended claims.

I claim:

1. A method of treating industrial waste water containing about 0.1% to about 5% by volume of oily material for the removal of organic and oily material therein which comprises exposing said waste water to impressed current by means of a plurality of spaced apart ferrosilicon alloy electrodes, said waste water containing about 10 to about 10,000 ppm of coagulant, some of which would normally deposit on the cathode, impressing direct current with a constant voltage of between about 10 to about 20 volts on a circuit including said electrodes thereby causing microbubbles to be formed in an amount in excess of $10^5$ microbubbles per liter and having an average size of about 200 microns or less which carry the oily material to the surface, and periodically reversing the current in said circuit often enough so that the size of the microbubbles does not exceed about 200 microns and whereby the electrodes are kept essentially clean from deposition of a coagulant.

2. The method of claim 1 wherein the size of the microbubbles formed to carry the oily material to the surface is between about 30 to about 200 microns.

3. The method of claim 1 wherein the current is reversed at least once in any given 24 hour period.

4. The method of claim 1 wherein the reversion of polarity is done in repetitive cycles of less than 24 hours.

5. The method of claim 1 wherein the energy applied to the waste water is between about 1 and about 8 amps minutes per gallon of water treated and the number of electrolytic microbubbles per liter is in the range of about $10^5$ to about $10^9$ microbubbles per liter.

6. A process for separating organic and oily material from industrial waste water by electrochemical cell action, said waste water containing a high concentration of metal hydroxides having a tendency to deposit on the cathodes of said elctrochemical cell, which process comprises conveying the waste water to a receptacle having an inlet end and an outlet end and having a plurality of electrochemical cells comprising ferrosilicon alloy electrodes near the bottom of the receptacle, impressing direct electrical current at a constant voltage of between about 10 and about 20 volts through the cells sufficient to produce microbubbles in excess of $10^5$ per liter and having an average micron size less than about 200 microns to carry the particles to the surface, subjecting the waste water to a gradient of current densities as the water passes from the inlet to the outlet end and periodically reversing the current in said electrochemical cells often enough so that the microbubbles do not exceed about 200 microns in size.

7. The process of claim 6 wherein the metal hydroxides are selected from the group consisting of ferric hydroxide, aluminum hydroxide, magnesium hydroxide, calcium hydroxide, or mixtures thereof.

8. The process of claim 6 wherein the current densities of each succeeding cell is a fraction of that of the previous cell.

9. The process of claim 6 wherein the current is reversed at least once in any given 24 hour period.

10. The method of claim 8 wherein the size of the microbubbles formed to carry the oily material to the surface is between about 30 to about 200 microns.

11. The process of claim 8 wherein the reversing of polarity is done in repetitive cycles at least once in any 24 hours.

* * * * *